March 4, 1930.  G. R. BELLAH  1,749,271
GARDEN TOOL
Filed April 12, 1928
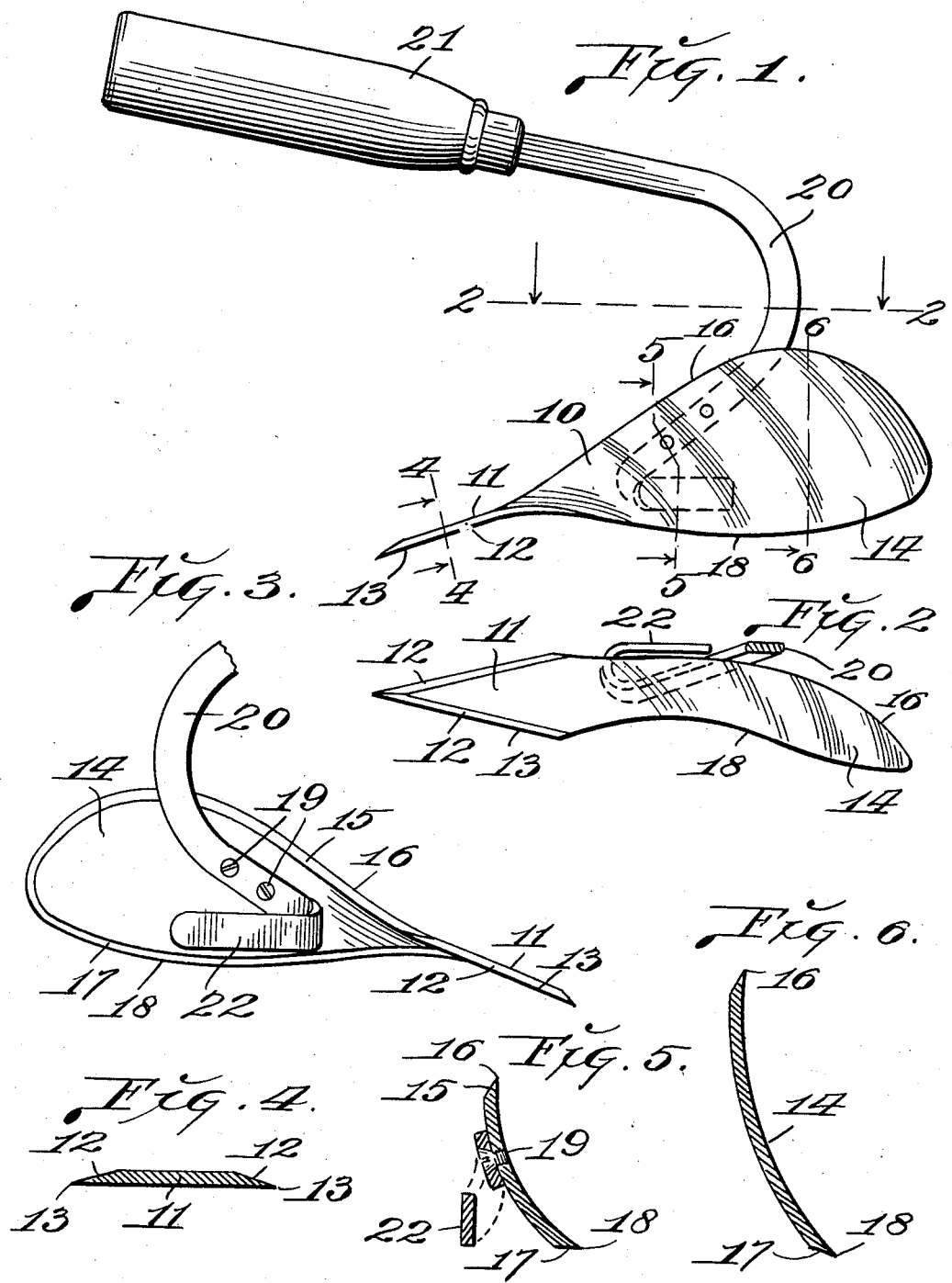
INVENTOR.
GEORGE R. BELLAH.
BY Martin C. Smith, ATTY.

Patented Mar. 4, 1930

1,749,271

UNITED STATES PATENT OFFICE

GEORGE R. BELLAH, OF LOS ANGELES, CALIFORNIA, ASSIGNOR OF ONE-HALF TO E. J. NAFFZIGER, OF GLENDALE, CALIFORNIA

GARDEN TOOL

Application filed April 12, 1928. Serial No. 269,392.

My invention relates to a garden tool and has for its principal object, the provision of a relatively simple, practical and inexpensive garden tool having a blade or share that may be conveniently used as a hoe, as a knife for cutting thru turf or for cutting the roots of weeds and the like, and as a mold board for turning over the earth, weeds, roots and the like that have been cut by the forward portion of the blade or share.

Further objects of my invention are to generally improve upon and simplify the construction of existing forms of garden tools, to provide a tool of the character referred to that may be mounted on a relatively short handle or upon a comparatively long handle after the manner of the standard forms of hoes, and further, to utilize a portion of the handle that is connected to the share as a guard or guide for directing and supporting the share when it is drawn forwardly in a comparatively straight line; for instance, while being drawn along the edge of a walk or pavement.

With the foregoing and other objects in view, my invention consists in certain novel features of construction and arrangement of parts that will be hereinafter more fully described and claimed and illustrated in the accompanying drawing, in which—

Fig. 1 is a side elevational view of a garden tool of my improved construction.

Fig. 2 is a horizontal section taken on the line 2—2 and showing the blade or share in plane view.

Fig. 3 is a rear elevational view of the blade or share and showing the guide that is formed on the end of the handle that is attached to said blade.

Fig. 4 is an enlarged cross sectional view taken on the line 4—4 of Fig. 1.

Fig. 5 is an enlarged cross section taken on the line 5—5 of Fig. 1.

Fig. 6 is an enlarged cross section taken on the line 6—6 of Fig. 1.

Referring by numerals to the accompanying drawings which illustrate a practical embodiment of my invention, 10 designates the blade or share or tool, the same being preferably formed of steel, and the forward portion of said blade or share is shaped so as to provide an elongated, flat, pointed blade 11 and the side edges of this pointed forward portion of the share are bevelled on top as designated by 12, to form a pair of diverging, sharp cutting edges 13.

The rear portion of the body of the tool is bent so that it occupies a substantially upright plane that gradually curves laterally toward its rear and, thereby forming a share 14 that is curved transversely throughout its length and the entire upper edge of this rear portion of the body of the tool is bevelled on its rear face as designated by 15 to form a sharp cutting edge 16, and that portion of the cutting edge to the rear of the pointed blade 11, is formed on a substantially straight line so that it forms a straight shear-like edge that is inclined with respect to the plane occupied by the pointed blade 11.

The entire lower edge of the substantially upright portion 14 of the tool is bevelled on its rear or lower face, as designated by 17, thereby forming a continuous sharp cutting edge 18 that is practically a continuation of the cutting edge 16 and the forward ends of these cutting edges 16 and 18 merge into the bevelled edges 12 at the rear end of the pointed forward portion 11 of the tool.

Thus, the body of the tool comprises a straight, flat, pointed, forward portion and a substantially upright, rear portion or share and the edges of the body of the tool are sharpened so as to produce continuous cutting edges.

Detachably secured to the upper portion of the rear face of the share 14, preferably by means of screws 19, is the lower portion of a flat metal bar or strap 20 that extends upwardly and rearwardly from the top of the share, and secured in any suitable manner to the upper end of this bar or strap, is a handle 21, which may be any desired length.

A portion of the bar or strap 20 extends below the point where the same is secured to the share and this extending portion is bent outwardly and thence rearwardly to form a horizontally disposed support and guiding member 22, that occupies a position directly opposite the lower portion of the body of the share and said support and guiding member being spaced a short distance away from said share. This support and guiding member 22 occupies a position to the rear and in longitudinal alignment with the rear portion of the corresponding side of the pointed blade 11, so that as the tool is drawn forwardly thru the ground, said support and guide will tend to direct or guide the point as the same passes thru the ground, thereby enabling the tool to be drawn along the edge of a pavement or walk so as to cut and turn over the adjacent ground or turf.

When my improved tool is used, the handle 21 is engaged and the share is moved downwardly and forwardly thru the ground and the pointed forward portion 11 provided with the inclined cutting edges 12, makes a substantially horizontal cut thru the ground, a short distance below the surface thereof and the straight inclined cutting edge immediately to the rear of the forward point, cuts in a vertical plane thru the turf or ground and the curved rear portion 14 of the share functions as a mold board to turn over the earth, weeds and grass that have been cut by the forward portion of the tool.

My improved garden tool may be made in various sizes and if desired, a plurality of the tools may be mounted on a single frame or handle, thus providing a tool that will hoe or cultivate a substantial width of ground.

Thus, it will be seen that I have provided a garden tool that is relatively simple in construction, inexpensive of manufacture and very effective in performing the functions for which it is intended.

It will be understood that minor changes in the size, form and construction of the various parts of my improved garden tool may be made and substituted for those herein shown and described without departing from the spirit of my invention, the scope of which is set forth in the appended claim.

I claim as my invention:

In a garden tool the combination with a shovel having a pointed forward end and the upright rear portion of said shovel being curved laterally, of a strap secured to the rear face of the upright laterally curved rear portion of the shovel, said strap extending upwardly and thence forwardly from said shovel, a handle secured to the upper forward portion of said strap and the lower end of which strap is bent outwardly and rearwardly to one side of the shovel to form a combined gauge and support for the tool.

In testimony whereof I affix my signature.

GEORGE R. BELLAH.